Patented Oct. 13, 1942

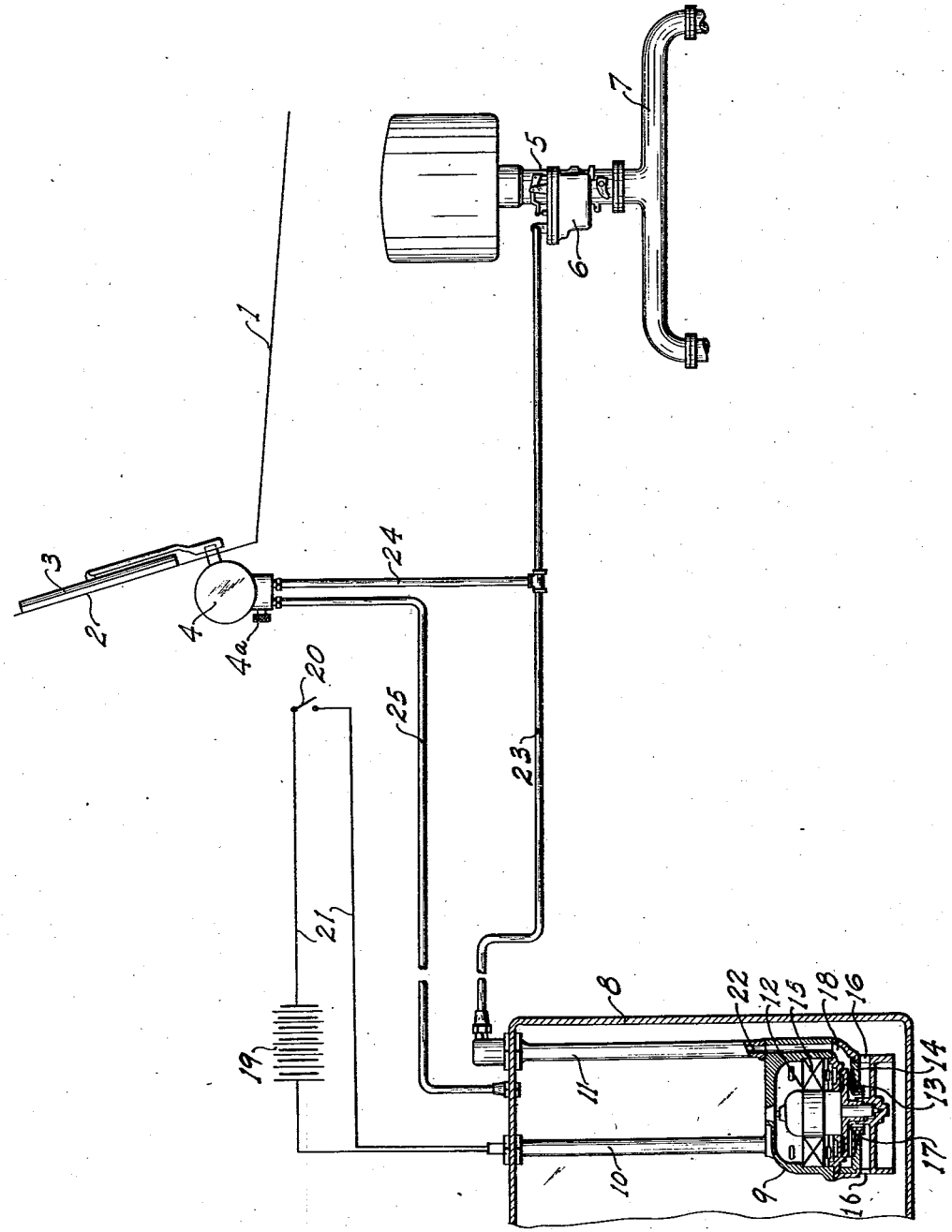

2,298,474

UNITED STATES PATENT OFFICE 2,298,474

WINDSHIELD CLEANER

George R. Ericson, Kirkwood, Mo., and Charles E. Markham, East St. Louis, Ill., assignors to Carter Carburetor Corporation, St. Louis, Mo., a corporation of Delaware Application September 30, 1939, Serial No. 297,283

3 Claims. (Cl. 15—253)

This invention relates to motor vehicle windshield cleaning devices of the fluid motor type and, more particularly, concerns the provision of fluid pressure for the operation thereof.

Various sources of fluid pressure which are immediately available in a motor vehicle have been proposed for the operation of windshield cleaning devices such as intake manifold vacuum, pressure feed lubricating oil systems, and pressure cooling water systems. Also various types of mechanically operated pumps which are driven by the engine have been used to provide fluid pressure for the operation of the windshield cleaning device.

These sources are all dependent upon engine operation and the pressures will, therefore, vary with the speed of the engine and in the case of manifold vacuum with engine load and speed. As it is desirable to maintain a reasonably constant speed of the windshield cleaning device and also to operate the device at times when the engine is not in operation, the above mentioned sources are inadequate.

It is an object of the present invention to provide a dependable and substantially unvarying fluid pressure independent of engine operation for the operation of the windshield cleaning device.

It is a further object of this invention to provide a single pumping unit for supplying liquid fuel at substantially constant pressure to the carburetor and to the windshield cleaner fluid motor for the operation thereof.

It is a further object of this invention to utilize a conveniently available medium for the transmission of power from the pumping unit to the windshield cleaner which will not solidify at low temperatures or appreciably change in viscosity throughout the normal temperature range.

The manner in which these objects are achieved is set forth in the following specification and accompanying drawing, referring to which:

The figure is a schematic view of the invention and relative motor vehicle parts.

Numeral 1 indicates the upper fore end of a motor vehicle having a windshield 2. A windshield wiper blade 3 is caused to move upon the windshield by a conventional fluid motor 4. The motor 4 is provided with a manual control valve 4a. A conventional carburetor 5 provided with a constant level chamber 6 is shown mounted on an engine intake manifold 7. A float actuated valve (not shown) controls the inlet to the constant level chamber. A portion of a fuel storage tank is indicated at 8. An electrically driven fuel pump 9 is provided and suspended in tank 8 by suspension rods 10 and 11.

Pump 9 is of the centrifugal type comprising an armature 12, an impeller 13 attached to the armature, a volute casing 14 and field windings 15. Fuel enters the lower pump chamber from the storage tank through inlet ports 16, passes into volute casing 14 through annular opening 17 and is discharged through outlet passage 18. Electrical energy for the operation of the electric pump is supplied by the storage battery 19. A switch 20 is provided in the circuit 21.

Fuel under pressure is conducted from the pump to the top of tank 8 through the bore 22 in support 11 and from the top of tank 8 to the carburetor constant level chamber 6 and the fluid motor 4 through conduit 23 and branch 24. A return line 25 from the motor 4 to the fuel tank 8 is provided.

The foregoing description and accompanying drawing are intended to be illustrative and not limiting and the use of all modifications within the scope of the following claims is contemplated.

We claim:

1. In a motor vehicle, a windshield cleaning device comprising a fluid operated motor mounted in a fixed position adjacent said windshield, a wiper blade connected to said motor and arranged to be moved across said windshield thereby, a source of liquid, and an electrically operated centrifugal pump for supplying said liquid under pressure to said fluid motor for the operation thereof.

2. In a motor vehicle, a windshield cleaning device comprising a fluid operated motor mounted in a fixed position adjacent said windshield, a wiper blade connected to said motor and arranged to be moved across said windshield thereby, a reservoir of liquid situated at a level substantially below that of said fluid motor, and an electrically operated centrifugal pump mounted in said reservoir for supplying said liquid to said fluid motor under pressure for the operation thereof.

3. In a motor vehicle, a windshield cleaning device comprising a fluid operated motor mounted in a fixed position adjacent said windshield, a wiper blade connected to said motor and arranged to be moved across said windshield thereby, a reservoir of gasoline situated at a level substantially below that of said fluid motor, and an electrically operated centrifugal pump mounted in said reservoir for supplying said gasoline to said fluid motor under pressure for the operation thereof.

GEORGE R. ERICSON.
CHARLES E. MARKHAM.